Dec. 5, 1939.   H. R. HUSTED   2,182,400

METHOD OF MOLDING PLASTIC MATERIAL

Filed Feb. 26, 1937   2 Sheets-Sheet 1

INVENTOR.
HARRY R. HUSTED
BY
*John H. Leonards*
his ATTORNEY.

Dec. 5, 1939.   H. R. HUSTED   2,182,400
METHOD OF MOLDING PLASTIC MATERIAL
Filed Feb. 26, 1937   2 Sheets-Sheet 2

INVENTOR.
HARRY R. HUSTED
BY
ATTORNEY.

Patented Dec. 5, 1939

2,182,400

UNITED STATES PATENT OFFICE 2,182,400

METHOD OF MOLDING PLASTIC MATERIAL

Harry R. Husted, St. Clair, Mich., assignor, by mesne assignments, to The Standard Products Company, Port Clinton, Ohio, a corporation of Ohio Application February 26, 1937, Serial No. 127,970

6 Claims. (Cl. 18—55)

This invention relates to an improvement in injection type molds and is more specifically directed to a method and means for controlling the flow and meeting of two approaching streams of thermoplastic material in a mold cavity, whereby the zone of the inherent weld line is controlled.

The preferred embodiment of the invention comprises a mold having separable mold sections, each of which is maintained at a different temperature for the purpose of effecting a control of the plasticity and flow of the material whereby the welding line of the approaching streams of material is located in predetermined desired locations.

In prior injection type molds of this general character, no attempt has been made to control the location of the weld line in any manner. Consequently, the minute apparent scratches or cracks appearing on the surface and characterizing these weld lines never occurred in the same location twice. As a result, many articles, if not rejected, required a subsequent finishing or touching operation along these weld lines in order to produce the desired appearance on the surface. Such subsequent finishing operations add greatly to the cost of the articles.

The principal object of the present invention, therefore, lies in the provision of a mold having a plurality of zones in which the temperature may be controlled independently so that the flow and plasticity of the thermoplastic coating can be controlled within reasonable and practical limits while in the mold.

A correlative object is to provide a mold of this character in which the temperatures of the separable sections are controlled independently of each other in a manner such that the weld line will occur at the least conspicuous zone on the surface of the molded article.

Another object is to provide a mold capable of consistently producing a uniform high quality of articles.

Other objects will become apparent from the following specification in conjunction with the accompanying drawings, in which.

For purposes of illustration, one embodiment of the invention will be described in connection with the coating of a steering wheel rim, its application to other articles being readily apparent therefrom.

Figure 3:
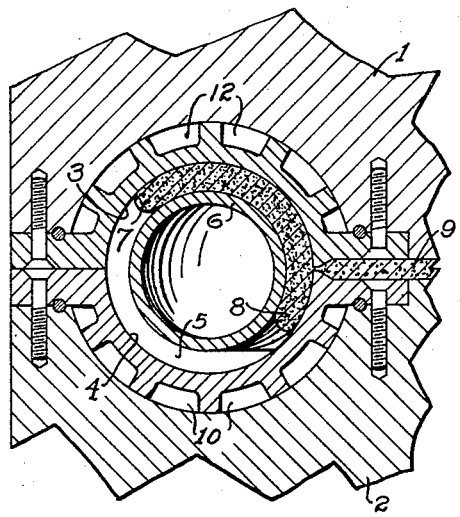
Figs. 3 and 4 are enlarged fragmentary cross sectional views through a mold showing the injected material in different stages of its travel.
Figure 4:
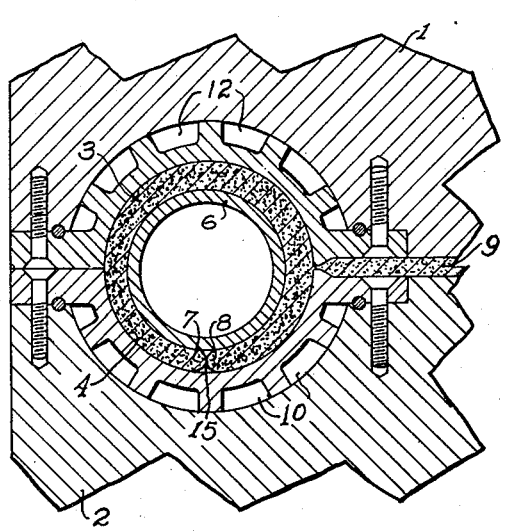
Figure 5:
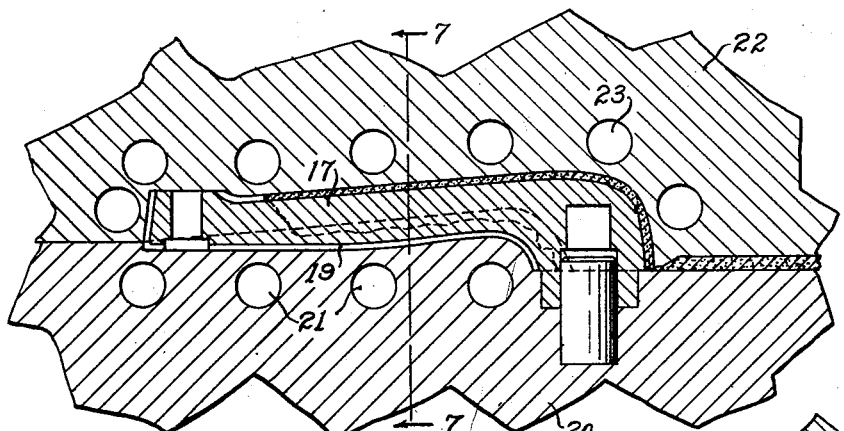
Fig. 5 is a fragmentary sectional view through a mold showing an article of hardware positioned therein.
Figure 6:
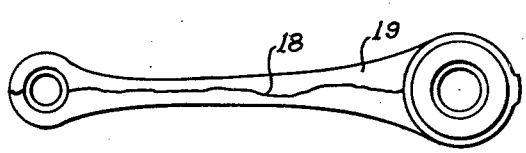
Fig. 6 is a bottom plan view of the article of hardware in Fig. 5, showing the position of the weld line at the underside of the piece.
Figure 7:
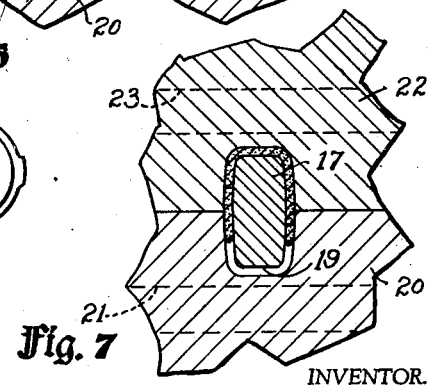
Fig. 7 is a fragmentary vertical sectional view through the mold and insert taken along a plane indicated by the line 7—7 of Fig. 5.

Referring to Figs. 3 and 4, the mold is shown comprising an upper mold section 1 and a lower mold section 2, the sections having cooperating recesses 3 and 4, respectively, which define a cavity 5 when the mold sections are closed.

Positioned within the cavity 5 and held in spaced relation from the walls thereof in any suitable manner, is an annular steering wheel rim insert 6, which in the present instance is shown in cross section.

Leading to the cavity 5 is a gate 9 which conducts the material under pressure from an injecting source through a suitable sprue 11.

The material upon entering the cavity 5 necessarily divides into two oppositely flowing streams 7 and 8 around the cross section of the insert 6 and concurrently tends to flow lengthwise of the insert, ofttimes before completely enveloping the cross section of the insert. The relative velocity of flow of these streams depends upon the relative resistance offered by the cavity walls 3 and 4 and also the resistance offered by the surface of the insert 6.

Such resistance to flow can be governed by the temperature of the material and of the cavity walls 3 and 4. Since the viscosity of the plastic material varies inversely with the temperature of the material, it follows that a relatively low temperature causes the material to become more viscous or more resistant to flow. Like all other flowing substances, it follows the path of least resistance. Thus, if the temperature in certain zones of the mold cavity is lower than in other zones, the rate of flow in these zones of low temperature is less than that in the higher temperature zones. Consequently, the portion of the mold cavity which is the hottest will be the first to become filled with material, and upon continued injection pressure on the material, the relatively cooler portion of the cavity will be the last to be filled. As a result, this relatively cooler portion of the mold cavity will inherently contain the meeting line of the different streams of material, and by controlling the temperatures of different zones independently of each other, the meeting line can be controlled. These temperatures are preferably within the customary limits utilized in practice, the higher temperatures being somewhat lower than the melting point of the material and the lower temperatures being of such a degree as to effect the desired flow-retarding results.

In the covering of steering wheel inserts or spiders with thermoplastic material, it is desirable to cause this meeting line to occur in the least conspicuous zone on the surface, that is, on the under side of the insert. Therefore, the lower cavity wall 4, which forms the under side of the finished wheel, may be maintained at a lower temperature than the upper cavity wall 3.

To effect and maintain this lower portion of the cavity at a relatively low temperature, conduits 10, through which thermal fluid at the desired temperature is passed, are provided in the mold section 3 and in close proximity with the cavity wall 4.

The upper mold section 1 is likewise provided with similar fluid conduits 12 closely adjacent the cavity wall 3 for conducting fluid at a different and preferably higher temperature than that flowing through the conduit 10 for maintaining the cavity wall 3 at a different or relatively higher temperature than the cavity wall 4. Consequently, the resistance to flow of material in the upper half of the mold cavity 5 is considerably less than that in the lower half by reason of the difference in temperature in the two halves.

Figure 1:
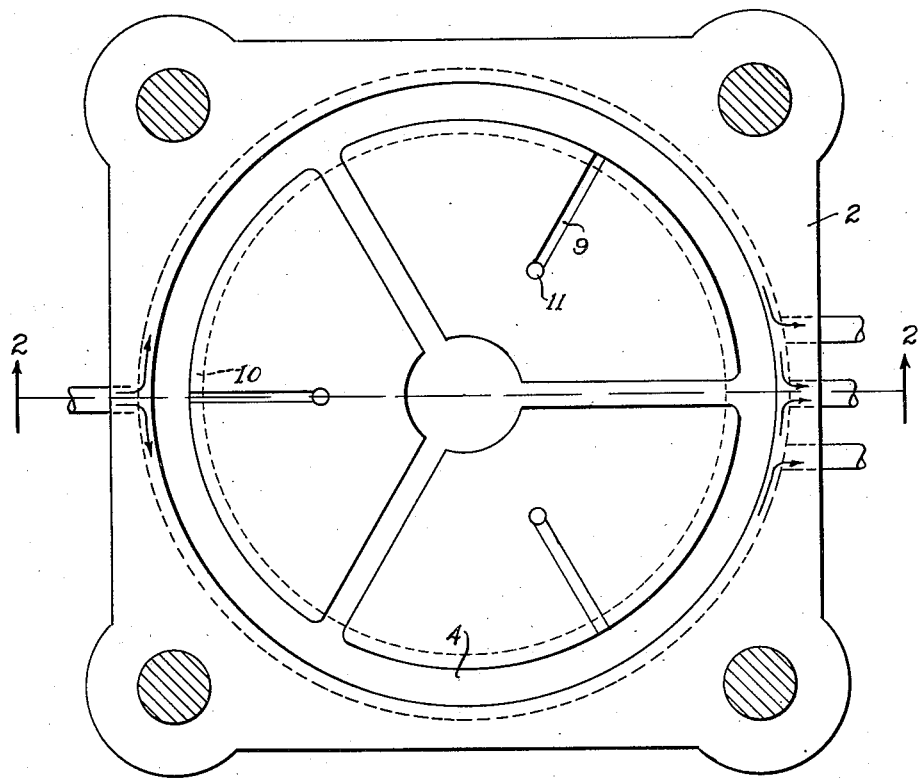
Fig. 1 is a plan view of a mold.

In operation, the stream of material from the gate 9, upon being injected into the mold cavity, divides into the pair of oppositely flowing streams 7 and 8 around the insert, as shown in Fig. 1, the upper stream 7 flowing at a more rapid rate than the lower stream 8 for the reasons stated above. Since the temperature of the cavity wall 4 is lower than the temperature of the wall 3, it follows that the streams of material 7 and 8 will meet each other in the coolest zone of the cavity to form a weld line 15. This zone is controlled in the manner above described and in the exemplary showing is located approximately at the lowermost portion of the cavity wall 4 which is the least conspicuous area on the entire steering wheel surface. Consequently, when the wheel is installed, the weld line is concealed from the view of the operator of the vehicle.

To further assure that the weld takes place in the desired location, the insert 6 may be off-set with respect to the cavity so that the portion of the insert where the weld occurs is relatively close to the cavity walls. Thus the insert 6 may be nearer the wall of the recess 4 than it is to the recess 3. This restricted portion of the cavity will offer greater resistance to flow of the material, and as a result, the material in the stream 7 will flow a greater distance around the top portion of the insert than the stream 8 flowing around the lower portion. Thus it will be seen that contracted portions of the cavity can be employed to assist in controlling the location in which the streams of material will meet, which is more fully described in an application of Dwight M. Anderson, Serial No. 132,849, filed March 24, 1937.

This method of controlling the zone of the weld line is relatively inexpensive because no radical change in the design and construction of the mold blocks of other injection type molds, such as shown in Patent No. 2,043,584, issued June 9, 1936, and application Serial No. 61,864, filed February 1, 1936, is necessary.

Figure 2:
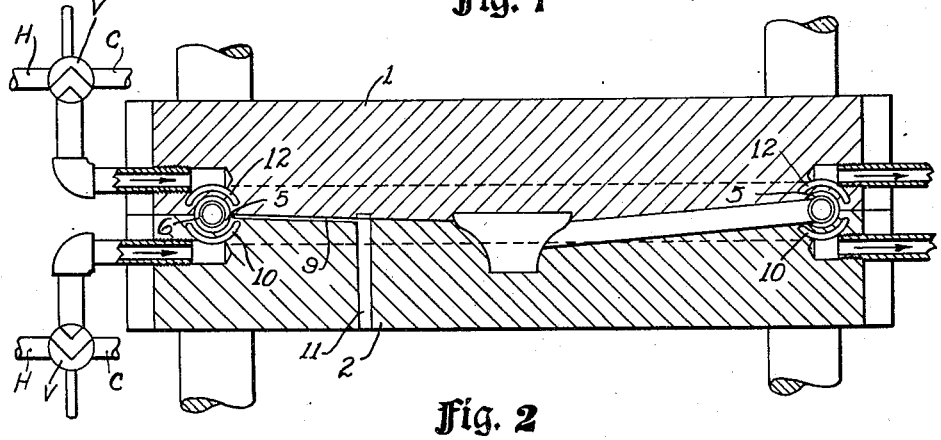
Fig. 2 is a vertical sectional view taken substantially along a plane indicated by the line 2—2 of Fig. 1.

For purposes of illustration, the method of connecting the ducts 10 and 12 to thermal fluid sources is shown in Figs. 1 and 2, wherein the hot fluid H or cold fluid C may be passed at the will of the operator by means of a valve V through the ducts for the purpose of heating one portion of the cavity while cooling another portion, as desired.

The principle of controlling the location of the weld line is equally applicable to other articles, such as an automobile window operating handle 17, shown in Fig. 3. In this particular article, it is desirable that the weld line 18 be positioned on the lower surface 19 of the handle so as to be on the side nearest the door and in the least conspicuous zone when in installed position on an automobile door. Therefore, the lower mold section 20 is provided with the passages 21 for conducting a cooling medium therethrough to maintain the temperature of this portion of the cavity at a certain degree. The upper mold section 22 is likewise provided with conduits 23 for conducting relatively warm thermal fluid therethrough to maintain the upper section of the mold cavity at a higher temperature than the mold section 20.

Thus it will be seen from the above description that a novel, effective and inexpensive method and means for controlling the position of the weld line on the surface of the finished article has been provided. By the use of this invention, it is possible to maintain a uniform quality of articles and greatly reduce the quantity of articles heretofore scrapped by reason of the objectionable weld line occurring at a conspicuous zone on the surface of the articles. The temperatures of the mold sections may be controlled and maintained automatically or manually, as desired.

Although a limited application of the invention has been shown and described for purposes of illustration only, it will be apparent to those skilled in the art that other applications, modifications, and adaptations may be made without departing from the spirit and scope as defined in the appended claims.

Having thus described my invention, what I claim is:

1. In the injection molding of articles of thermoplastic material wherein material injected into the mold is caused to flow in different directions and subsequently to approach and unite, the method of controlling the location of the weld produced between the relatively approaching portions of the material, which comprises maintaining said relatively approaching portions at different temperatures within the mold cavity to provide different rates of flow thereof and controlling said temperatures for controlling the meeting location of the portions whereby the approximate location of the weld is predetermined.

2. The method of controlling the location of weld in the injection molding of thermoplastic material wherein a stream of the material injected into the mold is divided and portions thereof caused to flow in different directions and subsequently to approach each other and reunite at a region remote from the entrance region, which method comprises injecting the material in plastic condition into a mold cavity and maintaining certain portions of the material in transit at a higher temperature than other portions for controlling the distance of travel of said portions respectively, whereby the zone of meeting of said different portions within the mold cavity and the resultant weld line is approximately predetermined.

3. The method of controlling the location of the weld in the injection molding of material the plasticity of which depends upon the degree of heat applied thereto, and wherein material injected into the mold is caused to flow in different directions and subsequently to approach and unite, which method comprises injecting the material in plastic condition into a mold cavity and concurrently maintaining predetermined portions of the walls of the mold cavity at different temperatures from other portions whereby the rate of flow of the material past said predetermined portions and said other portions is different.

4. The method of controlling the location of the zone of confluence of a plurality of streams of thermoplastic material during the injection mold coating of an insert which consists of supporting the insert in the mold cavity in spaced relation from the walls thereof, injecting material in the plastic state through an entrance into the space between the insert and the cavity walls, causing the material to divide adjacent said entrance into streams which flow in different directions within said space and around the insert and then to converge and meet in another portion of said space remote from the entrance, controlling the location of said meeting of the streams of material and resultant weld by maintaining the material of the stream of material flowing in one direction from the point of injection at a different temperature from that of the stream of material flowing in a different direction from the point of injection.

5. The method of controlling the location of the zone of confluence of a number of streams of thermoplastic material flowing in a mold cavity during the injection mold coating of an insert which consists of supporting the insert in the mold cavity in spaced relation from the walls thereof, injecting material in the plastic state through an entrance into the space between the insert and the cavity walls, causing the material to divide adjacent said entrance into streams which flow in different directions around the insert subsequently causing convergence and meeting of the streams to form a weld remote from said entrance, and controlling the location of said meeting of the streams of material and the resultant weld by maintaining different portions of the cavity walls at different temperatures.

6. The method of controlling the location of the zone of confluence of a plurality of streams of thermoplastic material during injection molding of the material in a manner tending to cause such confluence of separate streams within the mold cavity, comprising injecting the material in plastic condition into a mold cavity, maintaining portions of the mold cavity walls at a certain temperature and other portions of the mold cavity walls at a lower temperature while the material is flowing within the cavity under pressure and maintaining the material under pressure in the cavity for a predetermined interval after the cavity is filled.

HARRY R. HUSTED.